R. TOSSELL.
BUMPER FOR MOTOR VEHICLES.
APPLICATION FILED DEC. 26, 1918.
1,354,633. Patented Oct. 5, 1920.
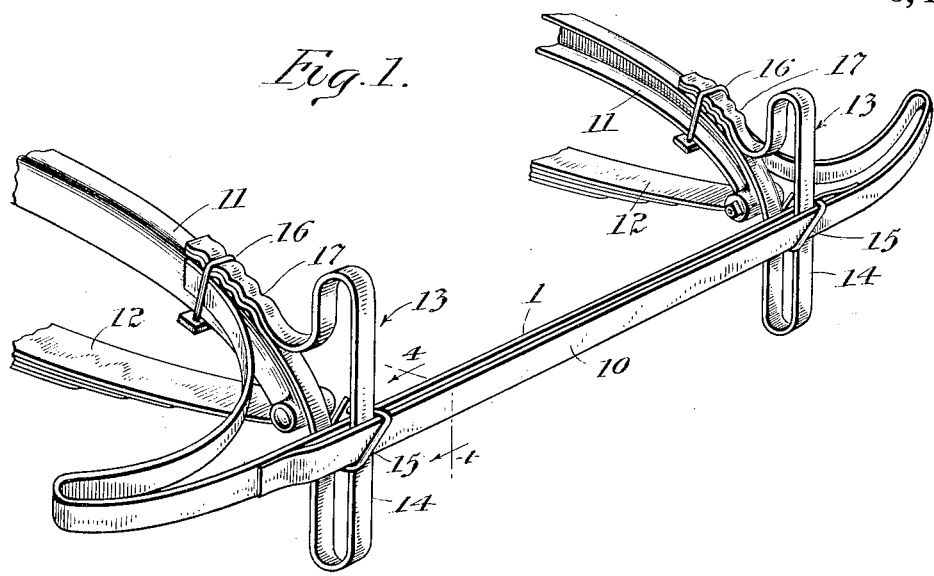
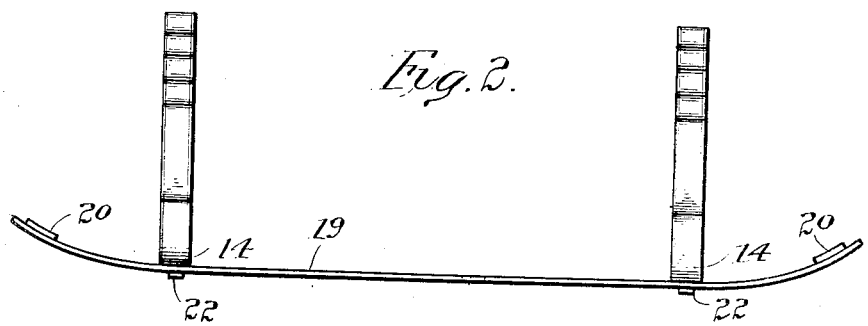
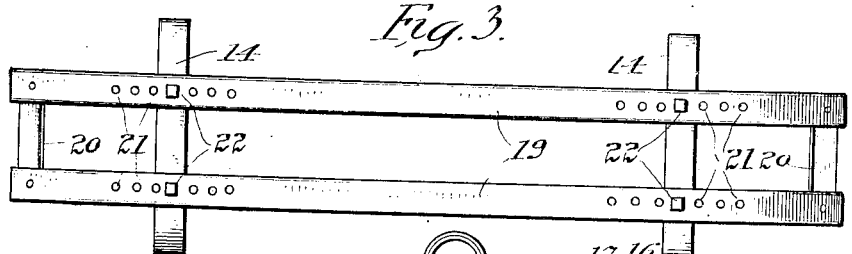
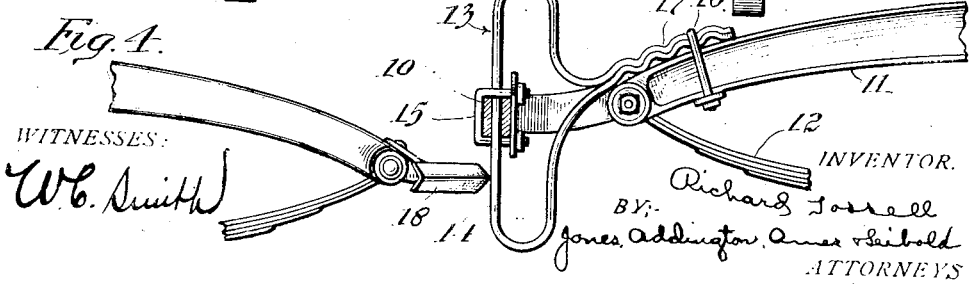

UNITED STATES PATENT OFFICE.

RICHARD TOSSELL, OF CHICAGO, ILLINOIS.

BUMPER FOR MOTOR-VEHICLES.

1,354,633.  Specification of Letters Patent.  Patented Oct. 5, 1920.

Application filed December 26, 1918. Serial No. 268,238.

*To all whom it may concern:*

Be it known that I, RICHARD TOSSELL, a citizen of the United States, residing at Chicago, in the county of Cook and State of Illinois, have invented new and useful Improvements in Bumpers for Motor-Vehicles, of which the following is a full, clear, concise, and exact description, reference being had to the accompanying drawing, forming a part of this specification.

My invention relates to bumpers for motor vehicles.

Bumpers for vehicles have heretofore been made which comprised substantially a horizontal bar extending across the full width of the vehicle in front or rear thereof, these bumpers being secured to the vehicle and located with the intention of preventing other vehicles from coming in contact with those parts which would be easily injured by a collision. With this type of bumper it often happens that the bumper on one vehicle will be lower than the bumper on another vehicle and that this bumper will pass underneath the bumper of the other vehicle and come in contact with parts of the other vehicle causing injury to one or both vehicles.

One of the objects of my invention is to provide an improved bumper for motor vehicles which will have a substantial vertical extent and which will prevent the bumper of another vehicle, no matter what the height of the other bumper, from coming in contact with parts which might be easily injured.

A further object of my invention is to provide an improved vehicle bumper which will be simple and strong in construction, durable and efficient in use, and neat in appearance.

Further objects will appear from the detailed description to follow and from the appended claims.

In the drawings, in which two embodiments of my invention are shown—

Figure 1 is a perspective view showing my improved bumper secured to the chassis of an automobile;

Fig. 2 is a plan view of a modified form of bumper;

Fig. 3 is a front view of the bumper shown in Fig. 2; and

Fig. 4 is a view showing my improved bumper in use and colliding with the bumper of another car, the section being substantially on the line 4—4 of Fig. 1.

Referring now to the drawings in detail, and first to the form of bumper shown in Fig. 1 (which is also the form shown in Fig. 4), this bumper comprises, in addition to a horizontally-extending bumper member which extends substantially across the full width of the car, two vertically-extending bumper members, one of the purposes of these vertically-extending members being for engagement with the cross-bar of the bumper of another car which may be above or below the horizontal member of the bumper shown, as indicated in Fig. 4. The horizontal portion of the bumper may comprise two similar members 10 which overlap each other and which are secured to the portions 11 of the chassis (these may be either the front or rear portions) to which the leaf-springs 12 are secured. The vertically-extending portion of the bumper comprises two similar bumper members 13, each secured at its rear end to the portion 11 of the chassis and having a vertically-extending front portion 14 lying between the horizontally-extending members 10. The members 10 are secured together and the vertically-extending portion 14 is secured in place between them by means of U-shaped clips 15. The members 10 and 13 are both secured to the chassis portion 11 by means of U-shaped clips 16, as shown in Fig. 1.

In order that the members 13 may readily be secured to chassis portions 11 of different design, the rear portions of the members 13 are made corrugated, as indicated at 17, so that the U-shaped clips 16 may be made to engage in the depression between any of the corrugations.

The use of my invention is indicated in Fig. 4, which shows a car equipped with my improved bumper colliding with another car having a lower bumper. If it were not for the vertically-extending portions 14, the horizontal bumper member 18 of the other car would pass underneath the members 10 and might damage the car.

In Figs. 2 and 3 I have shown another form of my invention, in which provision is made for preventing injury to the mudguards or fenders of the wheels due to a collision with a car coming in such a direction that its bumper might miss the vertically-extending portions 14. In this form of my invention the vertically-extending portions 14 may be the same as in the form previously described. I, however, provide two horizontally-extending cross-bars 19, to the ends of which are secured vertically-extending bumper members 20 located so as to prevent the end of the bumper of another car from bumping into the mud-guards or fenders for the wheels, or from bumping into the wheels themselves. In this form of my invention provision is made for attachment to cars in which the chassis members 11 are differently spaced by making a series of bolt-holes 21 in the members 19, into which bolts 22 are inserted for securing the members 19 to the vertically-extending portions 14 of the members 13.

It will be seen that by the provision of the vertically-extending members 14 and 20 it is rendered very improbable that the bumper of another car will cause any injury to a car provided with my improved bumper.

I claim as new and desire to secure by Letters Patent of the United States:

1. A vehicle bumper comprising a horizontal bumper bar extending across from one side to the other of an automobile, and a vertically-extending bumper member formed of a single steel bar shaped to form a vertically-extending loop portion, and two engaging end portions extending from said loop portion, and means for securing said end portions to the chassis of the automobile.

2. An automobile bumper construction, comprising a pair of spring brackets, one for each side of the automobile, lying in parallel vertical planes substantially through the side members of the chassis, and horizontally extending bumper means extending across from one side of the car to the other, and supported by said spring brackets, said spring brackets having vertical portions lying substantially in a vertical plane through said horizontally extending bumper means, said vertically extending portions extending a substantial distance both above and below the extreme vertical extent of said horizontally extending bumper means.

3. An automobile bumper construction comprising horizontally extending bumper means, extending laterally on both sides beyond the side members of the chassis, spring means secured to each of said side frame members, extending forwardly and outwardly for supporting the outer ends of said horizontally extending bumper means, and spring means extending directly forwardly from each of said side frame members for supporting the horizontally extending bumper means intermediate of its ends.

4. An automobile bumper construction comprising horizontally extending bumper means, extending laterally on both sides beyond the side members of the chassis, spring means secured to each of said side frame members, extending forwardly and outwardly for supporting the outer ends of said horizontally extending bumper means, and a pair of spring brackets, one secured to each of said side frame members, and extending forwardly therefrom, for supporting the horizontally extending bumper means intermediate of its ends, said spring bracket members having vertically extending portions lying substantially in a vertical plane through the horizontally extending bumper means, said vertically extending portions extending a substantial distance both above and below the extreme vertical extent of said horizontally extending bumper means.

5. An automobile bumper construction comprising horizontally extending bumper means, extending laterally on both sides beyond the side members of the chassis, spring means secured to each of said side frame members, extending forwardly and outwardly for supporting the outer ends of said horizontally extending bumper means, said spring means being secured to the outer sides of the side frame members respectively, and spring means secured to each of said side frame members and extending forwardly therefrom for supporting the horizontally extending bumper means intermediate of its ends, said last spring means bearing on the upper portions of the said side frame members.

6. An automobile bumper construction comprising a bumper member formed of a bar of sheet material bent to form an impact-receiving portion and a portion having a plurality of crimps to be adjustably secured to the side frame members of the chassis, by a securing means which can be secured in any one of said crimps.

In witness whereof I have hereunto subscribed my name.

RICHARD TOSSELL.